United States Patent
Choi et al.

(10) Patent No.: US 9,426,757 B2
(45) Date of Patent: Aug. 23, 2016

(54) METHOD AND APPARATUS FOR TRANSMITTING AND RECEIVING A SIGNAL IN MIMO BROADCAST CHANNEL WITH IMPERFECT CSIT

(71) Applicants: Samsung Electronics Co., Ltd., Suwon-si, Gyeonggi-do (KR); Imperial Innovations Ltd., London (GB)

(72) Inventors: Seunghoon Choi, Suwon-si (KR); Chenxi Hao, London (GB); Bruno Clerckx, London (GB)

(73) Assignees: Samsung Electroncs Co. Ltd., Suwon-si (KR); Imperial Innovations Ltd., London (GB)

( * ) Notice: Subject to any disclaimer, the term of this patent is extended or adjusted under 35 U.S.C. 154(b) by 0 days.

(21) Appl. No.: 14/596,669

(22) Filed: Jan. 14, 2015

(65) Prior Publication Data

US 2015/0200717 A1    Jul. 16, 2015

Related U.S. Application Data

(60) Provisional application No. 61/927,193, filed on Jan. 14, 2014.

(51) Int. Cl.
| | |
|---|---|
| H04B 7/02 | (2006.01) |
| H04W 52/26 | (2009.01) |
| H04W 28/22 | (2009.01) |
| H04B 7/06 | (2006.01) |
| H04W 28/06 | (2009.01) |
| H04B 7/04 | (2006.01) |
| H04W 52/24 | (2009.01) |

(52) U.S. Cl.
CPC .............. *H04W 52/26* (2013.01); *H04W 28/22* (2013.01); *H04B 7/0452* (2013.01); *H04B 7/0626* (2013.01); *H04W 28/06* (2013.01); *H04W 52/247* (2013.01); *H04W 52/265* (2013.01); *H04W 52/267* (2013.01)

(58) Field of Classification Search
CPC ...................................................... H04L 1/0618
USPC ......................................................... 375/267
See application file for complete search history.

(56) References Cited

U.S. PATENT DOCUMENTS

| | | | |
|---|---|---|---|
| 2003/0103470 A1* | 6/2003 | Yafuso ........................ | 370/282 |
| 2003/0104831 A1* | 6/2003 | Razavilar et al. ............. | 455/522 |

(Continued)

FOREIGN PATENT DOCUMENTS

WO    2014/009436    1/2014

*Primary Examiner* — Santiago Garcia
(74) *Attorney, Agent, or Firm* — Jefferson IP Law, LLP (57) ABSTRACT

A method and an apparatus for use in a multiuser radio communication system for transmitting and receiving a signal in a Multiple Input and Multiple Output (MIMO) broadcast channel with an imperfect Channel State Information at the Transmitter (CSIT) are provided. The signal transmission/reception method includes receiving CSI from each of a plurality of receivers, determining a transmit power and a transmission rate based on the CSI qualities of the plurality of receivers calculated from the CSI from each of the plurality of receivers, and transmitting the signal using the transmit power and the transmission rate. The present disclosure is capable of maximizing system throughput in wireless communication system.

7 Claims, 4 Drawing Sheets

(56) References Cited

U.S. PATENT DOCUMENTS

| | | |
|---|---|---|
| 2004/0082356 A1* | 4/2004 | Walton et al. ................. 455/522 |
| 2005/0259627 A1* | 11/2005 | Song et al. .................... 370/342 |
| 2006/0203731 A1* | 9/2006 | Tiedemann et al. .......... 370/235 |
| 2006/0233265 A1* | 10/2006 | Rajan .................... H04L 1/0002 375/259 |
| 2009/0252134 A1* | 10/2009 | Schlicht et al. ............... 370/338 |
| 2010/0142421 A1* | 6/2010 | Schlicht et al. ............... 370/310 |
| 2014/0254424 A1* | 9/2014 | Gao et al. ...................... 370/254 |

* cited by examiner

METHOD AND APPARATUS FOR TRANSMITTING AND RECEIVING A SIGNAL IN MIMO BROADCAST CHANNEL WITH IMPERFECT CSIT

CROSS-REFERENCE TO RELATED APPLICATION(S)

This application claims the benefit under 35 U.S.C. §119(e) of a U.S. Provisional application filed on Jan. 14, 2014 in the U.S. Patent and Trademark Office and assigned Ser. No. 61/927,193, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) IMPERIAL INNOVATIONS LTD.

TECHNICAL FIELD

The present disclosure relates to a multiple antenna multiuser radio communication system. More particularly, the present disclosure relates to transmission strategies for Multiple Input and Multiple Output (MIMO) broadcast channel with imperfect Channel State Information at the Transmitter (CSIT).

BACKGROUND

In Multi User-Multiple Input and Multiple Output (MU-MIMO) transmissions (for both Broadcast Channel and Interference Channel), the major performance drop is caused by the imperfect Channel State Information at the Transmitter (CSIT). This is because in current standards the MU-MIMO transmission strategy has been designed under the assumption of perfect CSI knowledge at the transmitter but is actually used in scenarios where CSI is imperfectly known at the transmitter. Moreover, given the CSIT feedback mechanism in current standardizations, the accuracies of the CSIT vary across subbands and users depending on the availability of wideband Precoding Matrix Indicator (PMI) and user-specific PMI. An interesting work is to design new transmission blocks that cope with the imperfect (instantaneous) CSIT and making use of the varying CSIT qualities to benefit the performance.

The metric considered in this disclosure is the Degrees of Freedom (DoF). It can be interpreted as the number of interference-free streams transmitted to each receiver. Mathematically, it is given by $$d = \lim_{P \to \infty} \frac{R}{\log_2 P},$$

where R is the rate and P stands for the Signal-to-Noise Ratio (SNR).

To investigate the impact of the imperfect CSIT on the sum DoF performance, the terminology, CSIT quality, is introduced. The CSIT quality is considered within the range of 0 to 1, representing unknown CSIT and perfect CSIT respectively. Moreover, the CSIT qualities are likely to vary across subbands and users. This setup can be interpreted as a practical deployment in line with Long Term Evolution (LTE) by connecting the CSIT quality with the availability of wideband PMI and subband PMI.

With the classical MU-MIMO transmission, the sum DoF performance is $N_2 - N_1 + N_1 \bar{a} + N_1 \bar{b}$, where $\bar{a}$ and $\bar{b}$ respectively stand for the average CSIT quality of receiver 1 and receiver 2 across all the subbands. If Single User-Multiple Input and Multiple Output (SU-MIMO) is performed, the maximal sum DoF performance will be $N_2$ if the transmitter only sends messages intended for receiver 2. The key ingredient of the achievability relies on the interference cancellation using the past CSIT and channel output.

Moreover, the optimal strategy for the Multiple Input and Single Output (MISO) case despite the existence of imperfect CSIT, but DoF loss is incurred if it is reused in the MIMO case. The transmitted signal is made up of private messages and common messages. Intuitively, since two receivers have different antennas, the number of common messages should be limited by $N_1$, otherwise, Rx1 is unable to decode them. This causes space resource wasted at Rx2 as it should have decoded $N_2$ streams of common messages at a time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a signal transmission method and apparatus embodied in such a way that a User Equipment (UE) generates feedback information in consideration of stochastic information on channel estimation error for use by a Base Station (BS) in a multi-antenna multiuser radio communication system.

Another aspect of the present disclosure is to provide a method and apparatus for feedback of channel information based on a channel estimation error prediction of a UE in a multi-antenna multiuser radio communication system.

Yet another aspect of the present disclosure is to provide a stochastic precoding design and stochastic user selection method and apparatus of a BS based on a feedback channel information received from a user in a multi-antenna multiuser radio communication system.

In accordance with an aspect of the present disclosure, a signal transmission/reception method of a terminal for use in a mobile communication system is provided. The signal transmission/reception method includes receiving a reference signal transmitted by a base station, estimating channel information based on the reference signal, predicting channel estimation error based on the channel information, and transmitting feedback information generated based on the channel estimation error to the base station.

In accordance with another aspect of the present disclosure, a signal transmission/reception method of a base station for use in a mobile communication system is provided. The signal transmission/reception method includes transmitting a reference signal to a terminal and receiving feedback information generated based on the reference signal, wherein the feedback information is generated based on channel estimation error by the terminal on the basis of the reference signal.

In accordance with another aspect of the present disclosure, a terminal of transmitting receiving signals for use in a mobile communication system is provided. The terminal includes a transceiver which transmits and receives signals to and from a base station and a control unit which controls the transceiver to receive a reference signal from the base station, estimates channel information based on the reference signal, predicts channel estimation error based on the channel information, and controls the transceiver to transmit feedback information generated based on the channel estimation error.

In accordance with another aspect of the present disclosure, a BS of transmitting receiving signals for use in a mobile communication system is provided. The BS includes a transceiver which transmits and receives signals to and from a terminal and a control unit which controls the transceiver to transmit a reference signal to the terminal and receive feedback information generated based on the reference signal, wherein the feedback information is generated based on channel estimation error by the terminal on the basis of the reference signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some of elements are exaggerated, omitted or simplified in the drawings and the elements may have sizes and/or shapes different from those shown in drawings, in practice. The same reference numbers are used throughout the drawings to refer to the same or like parts.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable recording medium that can direct a computer or other programmable data processing apparatus to function in a particular manner, such that the instructions stored in the non-transitory computer-readable recording medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the various embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

The various embodiments of the present disclosure are to be regarded in an illustrative rather than a restrictive sense in order to help understand the present disclosure. It is obvious to those skilled in the art that the present disclosure is applicable to other radio communication systems with appropriate modifications and changes without departing from the broader spirit and scope of the disclosure.

Although the description has been made with reference to particular embodiments, the present disclosure can be implemented with various modifications without departing from the scope of the present disclosure. Thus, the present disclosure is not limited to the particular embodiments disclosed but will include the following claims and their equivalents.

Although various embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

According to various embodiments of the present disclosure, the method of at enhancing the sum Degrees of Freedom (DoF) performance based on the integration of private messages and common messages as that in the Multiple Input and Single Output (MISO) case is suggested. The key ingredients lie in 1) always sending common messages and private symbols intended for Rx2 with the DoF $N_2$ and try to send private symbols to Rx1 with the DoF as large as possible; 2) design the transmission (e.g., precoder, power allocation, etc.) of common messages in order to achieve the target DoF for common messages at both receivers.

The following notations are used in the rest of this text. Bold lower letters stand for vectors whereas a symbol not in bold font represents a scalar. $(\bullet)^T$ and $(\bullet)^H$ represent the transpose and conjugate transpose of a matrix or vector respectively. $N(H)$ and $R(H)$ respectively stand for the null space and the range of H. $E[\bullet]$ refers to the expectation of a random variable, vector or matrix. $\|\bullet\|$ is the norm of a vector. $f(P) \sim P^B$ corresponds to $$\lim_{P \to \infty} \frac{\log f(P)}{\log P} = B$$

where P is SNR throughout the paper and logarithms are in base 2. $(x)^+$ means $\max(x, 0)$. $\gcd(N_1, N_2)$ is the greatest common devisor of integer $N_1$ and $N_2$.

Figure 1:
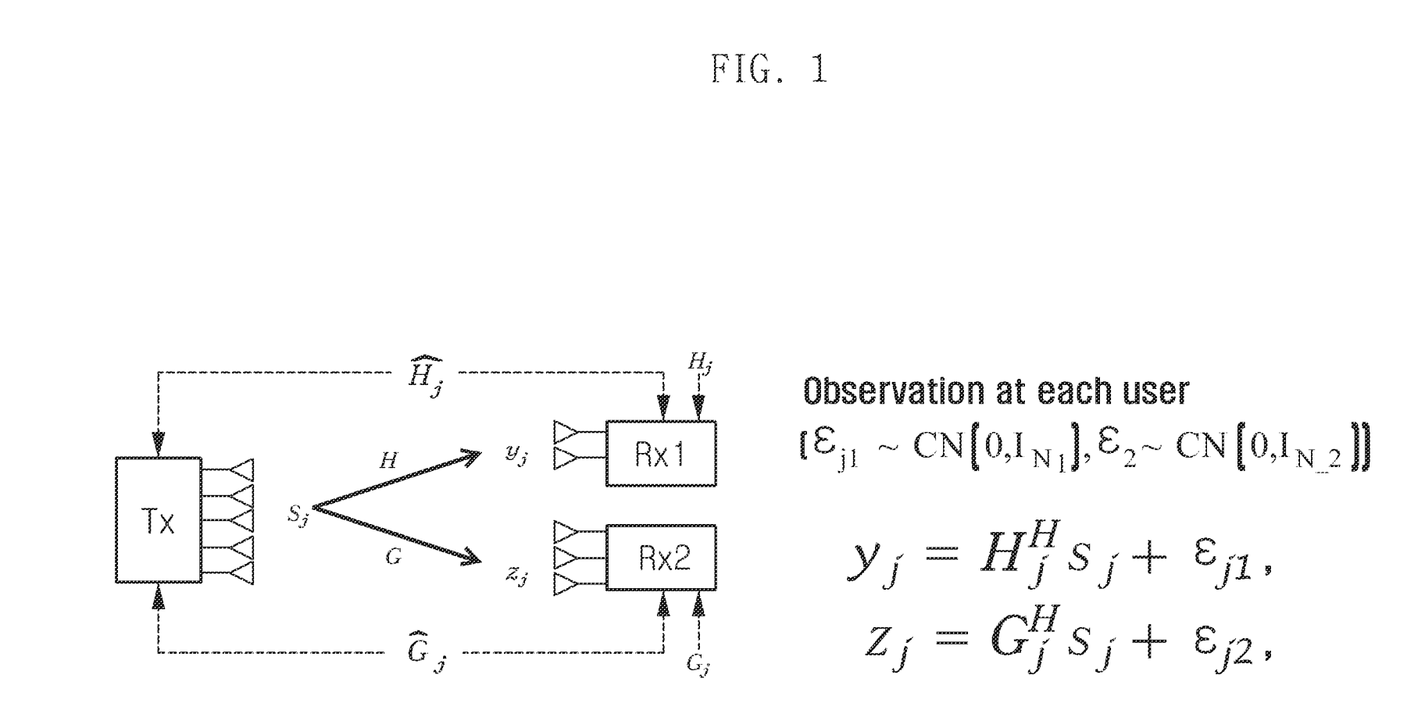
FIG. 1 is a diagram illustrating a system Model of (M, $N_1$, $N_2$) Multiple Input and Multiple Output (MIMO) Broadcast Channel with imperfect Channel State Information at the Transmitter (CSIT) according to an embodiment of the present disclosure.

FIG. 1 is a diagram illustrating a system Model of $(M, N_1, N_2)$ Multiple Input and Multiple Output (MIMO) Broadcast Channel with imperfect Channel State Information at the Transmitter (CSIT) according to an embodiment of the present disclosure.

2.1 System Model

Referring to FIG. 1, consider that a Tx has M antennas and two receivers, Rx1 and Rx2, which respectively have $N_1$ and $N_2$ antennas. Without loss of generality, assume $N_1 \leq N_2$. In any given subband j, the received signals at Rx1 and Rx2 are denoted by $y_j$ and $z_j$, where $y_j$ is a $N_1 \times 1$ vector and $z_j$ is a $N_2 \times 1$ vector. $\epsilon_{j1}$ and $\epsilon_{j2}$ are respectively the noise vector observed by Rx1 and Rx2. $\epsilon_{j1}$ and $\epsilon_{j2}$ are said to have a unit covariance matrix.

The transmitted signal in subband j is represented by a $M \times 1$ vector, $s_j$, subject to the power constraint $\|s_j\| \leq P$, where P stands for the SNR throughout this document. Similar to the MISO case, the transmitted signal consists of three kinds of messages:

Common messages I, denoted as $c^I$ hereafter, are broadcast to both users and unique for each subband. They should be recovered by both users, but can be intended exclusively for user 1 or user 2;

Common messages II, denoted as $c^{II}$ hereafter, should be recovered by both users, but can be intended exclusively for user 1 or user 2. Unlike $c^I$, $c^{II}$ are broadcast twice, i.e., once in a subband where Rx1 can decode it and once in a subband where Rx2 is more capable of decoding it; and Private message, denoted as $u_j$ and $v_j$ subband j, are respectively intended for user 1 or user 2 only. $u_j$ and $v_j$ are respectively $N_1 \times 1$ and $N_2 \times 1$ vectors. Private symbols intended for Rx1 and Rx2 are hereafter expressed as PS1 and PS2.

$H_j$ and $G_j$ respectively represent the channel of Rx1 and Rx2 in subband j. $H_j$ is a $M \times N_1$ complex Gaussian matrix with identity covariance. $H_j$ likely has full-rank. Similarly, $G_j$ is a full-rank $M \times N_2$ complex Gaussian matrix with identity covariance. As a start point, consider that $M \geq N_1 + N_2$.

Assume a general setup (valid for both Frequency Division Duplex (FDD) and Frequency Division Duplex (TDD)) where the transmitter obtains the CSI instantaneously, but with imperfectness, due to the estimation error and/or finite rate in the feedback link.

Denoting $\hat{H}_j$ and $\hat{G}_j$ as the imperfect CSI of Rx1 and Rx2 in subband j respectively, the CSI of user 1 and user 2 can be respectively modeled as:

$$H_j = \hat{H}_j + \tilde{H}_j, G_j = \hat{G}_j + \tilde{G}_j \quad \text{Equation 1}$$

where $\tilde{H}_j$ and $\tilde{G}_j$ are the corresponding error vectors. Each column of $\tilde{H}_j$ has the same norm $E[\tilde{h}_{ji}^H \tilde{h}_{ji}] = \sigma_{j1}^2$. Similarly, each column in $\tilde{G}_j$ has the same norm $E[\tilde{g}_{ji}^H \tilde{g}_{ji}] = \sigma_{j2}^2$. $\hat{H}_j$ and $\hat{G}_j$ are respectively independent of $\hat{H}_j$ and $\hat{G}_j$. The norm of the columns in $\hat{H}_j$ and $\hat{G}_j$ scale as $P^0$ when $P \to \infty$. $\hat{H}_j$ and $\hat{G}_j$ are obtained by both users and the transmitter, but $\tilde{H}_j$ and $\tilde{G}_j$ are only known by Rx1 and Rx2 respectively.

Figure 2:
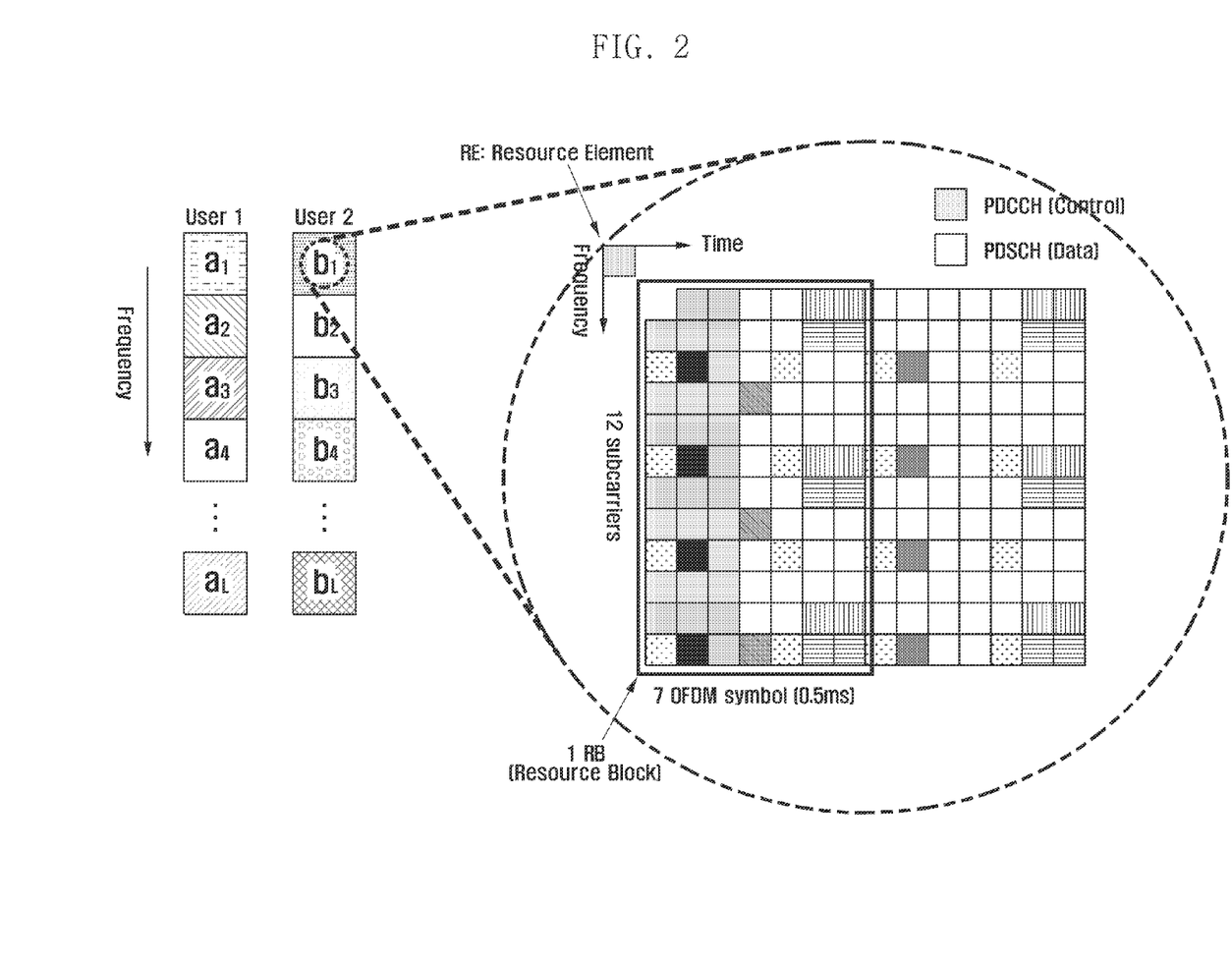
FIG. 2 is a diagram illustrating a CSIT pattern according to an embodiment of the present disclosure.

FIG. 2 is a diagram illustrating a CSIT pattern according to an embodiment of the present disclosure.

Referring to FIG. 2, to investigate the impact of the imperfect CSIT on the DoF performance, assume that the variance of the norm of each column in the error matrix exponentially scales with SNR, namely $\sigma_{j1}^2 \sim P^{-a_j}$ and $\sigma_{j2}^2 \sim P^{-b_j}$. $a_j$ and $b_j$ are respectively interpreted as the qualities of the CSIT of Rx1 and Rx2 in subband j and given as follows:

$$a_j = -\lim_{P \to \infty} \frac{\log \sigma_{j1}^2}{\log P}, \quad \text{Equation 2}$$

$$b_j = -\lim_{P \to \infty} \frac{\log \sigma_{j2}^2}{\log P}$$

$a_j$ and $b_j$ vary within the range of [0,1]. $a_j=1$ (resp. $b_j=1$) is equivalent to perfect CSIT because the full DoF performance, i.e., $(d_1, d_2) = (N_1, N_2)$, can be achieved by simply performing Zero-Forcing Beamforming (ZFBF). $a_j=0$ (resp. $b_j=0$) is equivalent to no CSIT because it means that the variance of the CSI error scales as $P^0$, such that the imperfect CSIT cannot benefit the DoF when doing ZFBF. Besides, $a_j$ and $b_j$ vary across all the L subbands as shown in FIG. 2.

It is important to note the following quantities, $$E_{H,N(H_j)}[H_j^H N(H_j)] = E_{H,N(H_j)}[(\hat{H}_j^H + \tilde{H}_j^H)N(H_j)] =$$
$$E_{H,N(H_j)}[\tilde{H}_j^H N(H_j)] \sim P^{-a_j} I_{N_1} \quad \text{Equation 3}$$

$$E_{G,N(G_j)}[G_j^H N(G_j)] = E_{G,N(G_j)}[(\hat{G}_j^H + \tilde{G}_j^H)N(G_j)] =$$
$$E_{G,N(G_j)}[\tilde{G}_j^H N(G_j)] \sim P^{-b_j} I_{N_2} \quad \text{Equation 4}$$

as they are frequently used in the rest of this disclosure.

2.2 Reusing MISO Case Scheme in the (M, $N_1$, $N_2$) MIMO Broadcast Channel

The main ingredient in the MISO case scheme is sending the private symbols via partial-ZFBF while transmitting common messages using the remaining power. The power and rate allocated to each private symbol and common symbol are determined based on the CSIT quality pattern. Besides, the common symbols are projected on the space spanned by the channels of both receivers. Generally, reusing the scheme in the (M, $N_1$, $N_2$) case, the transmitted signal in subband j is given by:

$$s_j = \frac{CS1 + CS2}{\left(P - P^{\max(a_j,b_j)}\right)I_{N_1}} + \frac{N(\hat{G})u_j}{P^b j_{I_{N_1}}} + \frac{N(\hat{H})v_j}{P^{a_j}I_{N_2}} \quad \text{Equation 5}$$

where $N(\hat{G})$ is a $M \times N_1$ precoding matrix spanning the null space of $\hat{G}$. Since the nullity of $\hat{G}$ is $M-N_2$ and $N_1 \leq M-N_2$ by assumption, it is possible to send $N_1$ symbols to the orthogonal space of $\hat{G}$. Similarly, $N(\hat{H})$ is a $M \times N_2$ precoding matrix spanning the null space of $\hat{H}$. The received signals are expressed as:

$$y_j = \underbrace{H_j^H(CS1 + CS2)}_{\left(P - P^{\max(a_j,b_j)}\right)I_{N_1}} + \underbrace{H_j^H N(\hat{G})u_j}_{P^b j_{I_{N_1}}} + \underbrace{H_j^H N(\hat{H})v_j}_{P^0 I_{N_1}} + \epsilon_{j1} \quad \text{Equation 6}$$

$$z_j = \underbrace{G_j^H(CS1 + CS2)}_{\left(P - P^{\max(a_j,b_j)}\right)I_{N_1}} + \underbrace{G_j^H N(\hat{G})u_j}_{P^0 I_{N_1}} + \underbrace{G_j^H N(\hat{H})v_j}_{P^{a_j}I_{N_2}} + \underbrace{\epsilon_{j2}}_{P^0 I_{N_1}} \quad \text{Equation 7}$$

Counting all the private symbols sent in the L subbands, $u_{1:L}$ achieve the $$DoF \frac{\sum_{j=1}^{L} N_1 b_j}{L} = N_1 \bar{b},$$

while $v_{1:L}$ achieve the $$DoF \frac{\sum_{j=1}^{L} N_2 a_j}{L} = N_2 \bar{a},$$

because the private symbols are allocated with the power subject to the quality of the CSIT of their unintended receivers and are drowned by the noise.

By treating the private symbols as noise, Rx1 can decode common messages (including both CS1 and CS2) with the $$DoF \frac{N_1 \sum_{j=1}^{L} 1 - b_j}{L},$$

while Rx2 can decode them with the $$DoF \frac{N_2 \sum_{j=1}^{L} 1 - a_j}{L},$$

As the common messages should be decodable by both receivers, the achievable DoF is $N_1(1-\max(\bar{a}, \bar{b}))$.

However, there are three problems limiting the sum DoF performance.

Space Resource Wasted at Rx2

With the MISO scheme, $N_1$ streams of common messages are sent at a time so as to make them decodable at both receivers. This causes $N_2 - N_1$ dimensions of the received signals at Rx2 unused when decoding the common messages. Intuitively, the sum DoF performance can be improved if the resource (space, frequency and power) at Rx2 are fully employed to since Rx2 has a larger inherent DoF (see Section 2.3 and MC 1 for details).

Achievable DoF of Common Messages

Definition of Inherent DoF for common messages: By treating the private symbols as noise, the inherent DoF for common messages at Rx1 and Rx2 are respectively $N_1(1-\bar{b})$ and $N_2(1-\bar{a})$.

The ideal DoF of the common messages is determined by the minimum value of them, namely $\min(N_1(1-\bar{b}), N_2(1-\bar{a}))$. However, this is not achievable by reusing the MISO case scheme. Specifically, simply considering a one-subband case with $N_1(1-\bar{b}) = N_2(1-\bar{a})$, Rx1 can decode each stream with a high DoF but the number of streams is small, while Rx2 can decode more symbols but each with a small DoF. In the MISO scheme, the common messages are projected to the space spanning the channels of both receivers, therefore the common messages can only be decoded with the DoF $\min(N_1, N_2) \times \min(1-a, 1-b)$, namely $\min(N_1, N_2)$ streams are sent, each of them has the DoF $\min(1-a, 1-b)$. Otherwise, at least one receiver will fail to decode them. Hence, a challenge is to design a transmission strategy to enhance the DoF of common messages such that both receivers can decode them at the same time.

Transmission Strategy when Rx2 has a Larger Inherent DoF for the Common Messages than Rx1

As a reminder, the MISO scheme said that when $\bar{a} < \bar{b}$ (or $1-\bar{a} > 1-\bar{b}$, namely Rx2 has larger inherent DoF for the common messages than Rx1 if $(N_1, N_2) = (1,1)$) is replaced, the transmission strategy design starts with finding $b'_{1:L}$ such that $\bar{b}' = \bar{a}$ and $b'_j \leq b_j$, $\forall j$. This mechanism is interpreted as decreasing the power and DoF allocated to PS1 and in turn the DoF of the common messages is increased. This mechanism does not harm the sum DoF performance since both receivers are having the same dimensions in their received signal and the common messages contribute to the sum DoF equivalently as the private symbols.

However, this equivalence does not hold generally in the MIMO case due to the discrepancy between the dimensions of the received signals at each receiver. Considering one-subband scenario and Rx2 has a larger inherent DoF for the common messages, namely $N_2(1-a) > N_1(1-b)$, the power and DoF of PS2 is increased rather than doing the above mechanism. Although a DoF loss might be incurred for the private symbols intended for Rx1, the sum DoF improves because the private symbols intended for Rx2 contribute more than Rx1.

Moreover, in multiple-subband scenario with varying CSIT qualities, increasing the DoF of PS2 in different subbands might cause a different DoF loss of PS1. Consequently, the CSIT quality pattern will have an impact on the sum DoF performance, when Rx2 has a larger inherent DoF for the common messages, namely $N_2(1-\bar{a}) > N_1(1-\bar{b})$.

In the next section, the main claims are provided which address the proposed problems and lead to an enhanced sum DoF performance.

2.3 Main Claims (MC)

In this section, MC 1 addresses the first and third problems in Section 2.2 while MC 2 and MC 3 address the solution to the second problem.

MC 1

A transmission strategy for two-receiver MIMO BC with imperfect CSIT comprises: 1) sending common messages (CS1 and CS2) and private messages (PS1 and PS2); 2) sending CS1, CS2 and PS2 with the DoF ($d_c$, $d_2$), such that $d_c+d_2=N_2$; 3) sending PS1 with the DoF as high as possible while guaranteeing $d_c+d_2=N_2$; and 4) based on the CSIT quality pattern, determining the number, power and precoder for each kind of message.

i. When $N_1(1-\bar{b}) \geq N_2(1-\bar{a})$, similar to the MISO case, the Tx1) sends common messages with the DoF $N_1(1-\bar{b})$; 2) sends PS1 with the DoF $N_1\bar{b}$ and PS2 with the DoF $N_2-N_1(1-\bar{b})=N_2(1-\bar{a}')$; 3) the power allocated to PS2 in each subband is $P^{a'_j}$, where $a'_j \leq a_j$.

ii. When $N_1(1-\bar{b}) < N_2(1-\bar{a})$, unlike the MISO case, the DoF of common messages, PS1 and PS2 depend on the specific CSIT pattern.

iii. In MC 1.iii, the Tx sends PS2 in each subband with power $P^{a'_j}$, $a'_j \geq a_j$, and they are determined by finding the equality regarding the inherent DoF at each Rx, namely $$\frac{1}{L}N_1 \sum_{j=1}^{L} (1 - \max(b_j, a_j - a'_j)) = \frac{1}{L}N_2 \sum_{j=1}^{L} (1 - a'_j).$$

iv. In MC 1.iv, the value of either side of equality is determined as the DoF for common messages.

v. In MC 1.iv, the calculation of $a'_j$ starts from the subband with lowest $b_j$.

vi. Unlike the MISO case, the common messages are transmitted using the strategy given in MC 2 and MC 3 because the two receivers employ a different number of antennas to decode them.

Intuition 1 of MC 1: Sending PS1 with power higher than $P^{b_j}$ is equivalent with sending them with power $P^{b_j}$. Generally, the following equalities regarding the inherent DoF at each receiver and achieved DoF tuple ($d_c$, $d_1$, $d_2$) can be written as:

$$N_1 = d_c + d_1 + I_1 \quad \text{Equation 8}$$

$$N_2 = d_c + d_2 + I_2 \quad \text{Equation 9}$$

where $I_2$ is the interference caused by PS1 because they are sent with power higher than $P^{b_j}$. Now the power of PS1 is reduced to $P^{b_j}$. Consequently, there is no interference caused at Rx2 and in turn the DoF of PS2 is increased to $d'_2=d_2+I_2$. At the same time, the DoF of PS1 is decreased to $d'_1=(d_1-I_2)^+$. Besides, the DoF of common messages remains. The resulted sum DoF is $d_c+d'_1+d'_2=d_c+d_2+I_2+(d_1-I_2)^+ = d_1+d_2+d_c+(I_2-d_1)^+ \geq d_1+d_2+d_c$.

Intuition 2: When Rx2 has a larger inherent DoF, increasing the power allocated to PS2 with the DoF $d'_c+d'_2=N_2$ results in a better sum DoF performance. Here, considering Rx2 has a larger inherent DoF, $I_2$ in the equation $N_2=d_c+d_2+I_2$ stands for the unused resource.

Now, the DoF of PS2 $d'_2$ is increased, where $d'_2=d_2+I_2$. Since PS2 consists of $N_2$ streams, the increment in each stream is $$\frac{I_2}{N_2}.$$

Moreover, as the received signal at Rx1 has $N_1 (\leq N_2)$ dimensions, this increment results it $$\frac{I_2}{N_2} \times N_1$$

interference at Rx1. Hence, if $$d_1 \geq \frac{I_2}{N_2} N_1,$$

the DoF of PS1 becomes $$d'_1 = d_1 - \frac{I_2}{N_2} N_1$$

and the DoF of common messages remains. The equalities are $$N_1 = d_c + d'_1 + \frac{I_2}{N_2} N_1 + I_1 \text{ and } N_2 = d_c + d'_2.$$

Apparently, the resulted sum DoF is improved because the increase in the DoF of PS1 is greater than the loss of the DoF of PS2.

If $$d_1 < \frac{I_2}{N_2} N_1,$$

the Tx sends PS2 and common messages with $d'_c+d'_2=N_2$ and $d'_2>d_2+I_2$. In this case, the DoF of PS1 becomes zero. The resulted sum DoF is $d'_c+d'_2=(d_c+d_2+I_2)+d_1-d_1=(d_c+d_1+d_2)+(I_2-d_1)>d_c+d_1+d_2$.

Combining these two intuitions, the key ingredients lie in always sending common messages and PS2 with the DoF $d_c+d_2=N_2$. Refer to Section 2.4.3 and 2.5.4 for more details.

MC 2

The transmission of CS1 comprises: properly determining the number, power and precoder of CS1, such that Rx1 decodes them using $N_1$ antennas and at the same time Rx2 decodes them with $N_2$ antennas. More specifically, i. $t\hat{N}_1\hat{N}_2$CS1 are sent, where $$t = \gcd(N_1, N_2), \hat{N}_1 = \frac{N_1}{t}, \hat{N}_2 = \frac{N_2}{t};$$

ii. Each CS1 achieves the $$DoF \Delta = \frac{d_c}{t\hat{N}_1\hat{N}_2},$$

where $d_c$ is the target DoF of CS1; and iii. With $n=1, 2, \ldots, t\hat{N}_1\hat{N}_2$ denoting the index of the CS1, For those $$\left\lceil \frac{n}{N_1} \right\rceil = \left\lceil \frac{n}{N_2} \right\rceil,$$

the precoder is a vector in the space spanned by the channels of both receivers. The power allocated to them is $$P^{1-(\lceil \frac{n}{N_1} \rceil - 1)\Delta};$$

and
For those $$\left\lceil \frac{n}{N_1} \right\rceil > \left\lceil \frac{n}{N_2} \right\rceil,$$

the precoder is a summation of two parts: 1) a vector in the space spanned by the channels of both receivers and with power $$P^{1-(\lceil \frac{n}{N_1} \rceil - 1)\Delta};$$

2) a vector in the null space of the channel of Rx1 and with power $$P^{1-(\lceil \frac{n}{N_2} \rceil - 1)\Delta}.$$

As a consequence of the precoder design and power allocation, Rx1 will observes the CS1 in $\hat{N}_2$ power levels and each level contains $N_1$ unique CS1, while Rx2 will observes the CS1 in $\hat{N}_1$ power levels and each level contains $N_2$ unique CS1. Refer to Section 2.4.1 for details of the transmission design.

MC 3

Transmission of CS2 comprises: properly determining the number and power of the CS2, such that Rx1 decodes them using $N_1$ antennas in the subband where Rx1 has a large inherent DoF for the common messages, and Rx2 decodes them using $N_2$ antennas in the subband where Rx2 has a large inherent DoF for the common messages. More specifically, i. $t\hat{N}_1\hat{N}_2$ common symbols are sent, where $t=\gcd(N_1, N_2)$, $$\hat{N}_1 = \frac{N_1}{t}, \hat{N}_2 = \frac{N_2}{t};$$

ii. Each common symbol achieves the $$DoF\delta = \frac{d_c}{t\hat{N}_1\hat{N}_2},$$

where $d_c$ is the target DoF of CS2; and iii. Without loss of generality, assume that Rx1 decodes them in subband 1 while Rx2 recovers them in subband 2. These $t\hat{N}_1\hat{N}_2$ common symbols are sent twice:

In subband 1, the CS2 with index n (where n=1, 2, ..., $t\hat{N}_1\hat{N}_2$) is sent with the precoder in the space spanned by the channel of Rx1 and allocated with power $$P^{1-(\lceil \frac{n}{N_1} \rceil - 1)\Delta};$$

and
In subband 2, the CS2 with index n (where n=1, 2, ..., $t\hat{N}_1\hat{N}_2$) is sent with the precoder in the space spanned by the channel of Rx2 and allocated with power $$P^{1-(\lceil \frac{n}{N_2} \rceil - 1)\Delta}.$$

As a consequence, Rx1 will observe the CS2 in $\hat{N}_2$ power levels and each level contains $N_1$ unique CS2 while Rx2 will observe the CS2 in $\hat{N}_1$ power levels and each level contains $N_2$ unique CS2. In this way, Rx1 (resp. Rx2) can decode them from subband 1 (resp. subband 2) and remove the CS2 in subband 2 (resp. subband 1) so as to decode other symbols in subband 2 (resp. subband 1). Refer to Section 2.5.1 for more details.

Note that when $N_1=N_2$, MC 2 and MC 3 will become the same and similar as that in MISO scheme.

2. 4 Transmission Strategy for One Subband Scenario 2.4.1. $N_1(1-b)=N_2(1-a)$, Two Receivers have the Same Inherent DoF for Common Messages $N_1$ PS1 are sent with the power $P^b$ and the precoder $N(\hat{G})$, while $N_2$PS2 are sent with power $P^a$ and the precoder $N(\hat{H})$.

According to MC 2, the $t\hat{N}_1\hat{N}_2$ CS1 are received by Rx1 in $N_2$ power levels and each level contains $N_1$ unique CS1, while they are received by Rx2 in $\hat{N}_1$ power levels and each level contains $N_2$ unique CS1. Note that higher index of the level refers to a lower received power. The gap between two adjacent power levels is $\Delta$.

It is obvious that some CS1 are received in the same power level at each receiver (namely, $$\left\lceil \frac{n}{N_1} \right\rceil = \left\lceil \frac{n}{N_2} \right\rceil,$$

n is the index of the CS1) while others are received in the difference power levels (namely, $$\left\lceil \frac{n}{N_1} \right\rceil > \left\lceil \frac{n}{N_2} \right\rceil).$$

To this end, the precoder of these CS1 are designed to make use of the null space of the CSIT of Rx1. More specifically, $\hat{N}_1\hat{N}_2 t$ different CS1 are sent, each achieves the $$DoF\Delta = \frac{1-a}{\hat{N}_1} = \frac{1-b}{\hat{N}_2};$$

For those $$\left\lceil \frac{n}{N_1} \right\rceil = \left\lceil \frac{n}{N_2} \right\rceil,$$

the precoder is a vector in the space spanned by the channels of both receivers. The power allocated to them is $$P^{1-(\lceil \frac{n}{N_2} \rceil - 1)\Delta}.$$

These CS1 can be expressed $$\frac{R(\hat{H}, \hat{G})c_n}{P^{1-(\lceil \frac{n}{N_2} \rceil - 1)\Delta}};$$

For those $$\lceil \frac{n}{N_1} \rceil > \lceil \frac{n}{N_2} \rceil,$$

the precoder is a summation of two parts: 1) a vector in the space spanned by the channels of both receivers with power $$P^{1-(\lceil \frac{n}{N_1} \rceil - 1)\Delta};$$

2) a vector in the null space of $\hat{H}$ with power $$P^{1-(\lceil \frac{n}{N_2} \rceil - 1)\Delta}.$$

These CS1 can be written as $$\left( \frac{R(\hat{H}, \hat{G})}{P^{1-(\lceil \frac{n}{N_1} \rceil - 1)\Delta}} + \frac{N(\hat{H})}{P^{1-(\lceil \frac{n}{N_2} \rceil - 1)\Delta}} \right) c_n,$$

where the first term is dominant at Rx1 while the second term is dominant at Rx2.

The transmitted signal is expressed as:

$$s = \left( \sum_{n=1, \lceil \frac{n}{N_1} \rceil = \lceil \frac{n}{N_2} \rceil}^{\hat{N}_1 \hat{N}_2 t} \frac{R(\hat{H}, \hat{G})c_n}{P^{1-(\lceil \frac{n}{N_2} \rceil - 1)\Delta}} \right) +$$

$$\left( \sum_{n=1, \lceil \frac{n}{N_1} \rceil > \lceil \frac{n}{N_2} \rceil}^{\hat{N}_1 \hat{N}_2 t} \frac{R(\hat{H}, \hat{G})c_n}{P^{1-(\lceil \frac{n}{N_1} \rceil - 1)\Delta}} + \frac{N(\hat{H})c_n}{P^{1-(\lceil \frac{n}{N_2} \rceil - 1)\Delta}} \right) +$$

$$\frac{N(\hat{G})u}{P^b I_{N_1}} + \frac{N(\hat{H})v}{P^a I_{N_2}}$$

Equation 10

1) The received signal at Rx1 is:

$$y = \left( \sum_{n=1, \lceil \frac{n}{N_1} \rceil = \lceil \frac{n}{N_2} \rceil}^{\hat{N}_1 \hat{N}_2 t} \frac{H^H R(\hat{H}, \hat{G})c_n}{P^{1-(\lceil \frac{n}{N_2} \rceil - 1)\Delta}} \right) +$$

$$\left( \sum_{n=1, \lceil \frac{n}{N_1} \rceil > \lceil \frac{n}{N_2} \rceil}^{\hat{N}_1 \hat{N}_2 t} \frac{H^H R(\hat{H}, \hat{G})c_n}{P^{1-(\lceil \frac{n}{N_1} \rceil - 1)\Delta}} + \frac{H^H N(\hat{H})c_n}{P^{1-(\lceil \frac{n}{N_2} \rceil - 1)\Delta - a}} \right) +$$

$$\frac{H^H N(\hat{G})u}{P^b I_{N_1}} + \frac{H^H N(\hat{H})v + \epsilon_1}{P^0 I_{N_1}}$$

Equation 11

$$\approx \left( \sum_{n=1, \lceil \frac{n}{N_1} \rceil = \lceil \frac{n}{N_2} \rceil}^{\hat{N}_1 \hat{N}_2 t} \frac{H^H R(\hat{H}, \hat{G})c_n}{P^{1-(\lceil \frac{n}{N_2} \rceil - 1)\Delta}} \right) +$$

$$\left( \sum_{n=1, \lceil \frac{n}{N_1} \rceil > \lceil \frac{n}{N_2} \rceil}^{\hat{N}_1 \hat{N}_2 t} \frac{H^H R(\hat{H}, \hat{G})c_n}{P^{1-(\lceil \frac{n}{N_1} \rceil - 1)\Delta}} \right) + \frac{H^H N(\hat{G})u}{P^b I_{N_1}} +$$

$$\frac{H^H N(\hat{H})v + \epsilon_1}{P^0 I_{N_1}}$$

$$= \left( \sum_{n=1}^{\hat{N}_1 \hat{N}_2 t} \frac{H^H R(\hat{H}, \hat{G})c_n}{P^{1-(\lceil \frac{n}{N_1} \rceil - 1)\Delta}} \right) + \frac{H^H N(\hat{G})u}{P^b I_{N_1}} + \frac{H^H N(\hat{H})v + \epsilon_1}{P^0 I_{N_1}}$$

$$= \left( \sum_{n=1}^{N_1} \frac{H^H R(\hat{H}, \hat{G})c_n}{P} + \sum_{n=N_1+1}^{N_1 \times 2} \frac{H^H R(\hat{H}, \hat{G})c_n}{P^{1-\Delta}} + \ldots + \sum_{n=N_1+(\hat{N}_2-1)+1}^{N_1 \times \hat{N}_2} \frac{H^H R(\hat{H}, \hat{G})c_n}{P^{1-(\hat{N}_2-1)\Delta}} \right) +$$

$$\frac{H^H N(\hat{G})u}{P^b I_{N_1}} + \frac{H^H N(\hat{H})v + \epsilon_1}{P^0 I_{N_1}}$$

The approximation is due to the fact that $H^H R(\hat{H}, \hat{G})c_n$ is dominant compared to $H^H N(\hat{H})c_n$ at high SNR, namely $$1 - (\lceil \frac{n}{N_1} \rceil - 1)\Delta \geq 1 - (\lceil \frac{n}{N_2} \rceil - 1)\Delta - a \cdot \forall n \in [1, \hat{N}_1 \hat{N}_2 t].$$

This can be verified by replacing $$\Delta = \frac{1-b}{N_2}$$

and using the fact that $$\lceil \frac{n}{N_1} \rceil - \lceil \frac{n}{N_2} \rceil \leq N_2 - N_1 \text{ and } N_1(1-b) = N_2(1-a).$$

From the last equation, the $N_1 \times N_2$ CS1 received at Rx1 are written in $\hat{N}_2$ terms. Each term consists of $N_1$ different CS1 with the same power. Specifically, the m th term (m∈1, 2, ... $\hat{N}_2$) contains the common symbols with index from (m−1)× $N_1$+1 to m×$N_1$, and their received power scale as $P^{1-(M-1)\Delta}$.

Decoding at Rx1 (MMSE-SIC): Since the dimension of received signal is $N_1$, Rx1 decode $N_1$ CS1 at a time by treating the r.h.s of them as noise. In this way, each CS1 recovered in the $1^{st}$ to the $(N_2-1)$th term achieves the DoF $\Delta$. Each CS1 in the last term is recovered by treating $H^H N(\hat{G})u$ as noise and the DoF is $1-(N_2-1)\Delta-b=\Delta$. After that, all the CS1 have been removed and the private symbols u are decoded only subject to noise. Consequently, the DoF of the common message achieved at Rx1 is $\hat{N}_1 \hat{N}_2 t\Delta = N_1(1-b) = N_2(1-a)$ and the DoF of private symbols intended for Rx1 is $N_1 b$.

2) The received signal at Rx2 is:

$$z = \left( \sum_{n=1, \lceil \frac{n}{\hat{N}_1} \rceil = \lceil \frac{n}{\hat{N}_2} \rceil}^{\hat{N}_1 \hat{N}_2 t} \frac{G^H R(\hat{H}, \hat{G}) c_n}{P^{1-(\lceil \frac{n}{\hat{N}_2} \rceil - 1)\Delta}} \right) +$$
Equation 12

$$\left( \sum_{n=1, \lceil \frac{n}{\hat{N}_1} \rceil > \lceil \frac{n}{\hat{N}_2} \rceil}^{\hat{N}_1 \hat{N}_2 t} \frac{G^H R(\hat{H}, \hat{G}) c_n}{P^{1-(\lceil \frac{n}{\hat{N}_1} \rceil - 1)\Delta}} + \frac{G^H N(\hat{H}) c_n}{P^{1-(\lceil \frac{n}{\hat{N}_2} \rceil - 1)\Delta}} \right) +$$

$$\frac{G^H N(\hat{G}) u}{P^0 I_{N_1}} + \frac{G^H N(\hat{H}) v}{P^a I_{N_2}} + \frac{\epsilon_2}{P^0 I_{N_2}}$$

$$= \left( \sum_{n=1, \lceil \frac{n}{\hat{N}_1} \rceil = \lceil \frac{n}{\hat{N}_2} \rceil}^{\hat{N}_1 \hat{N}_2 t} \frac{G^H R(\hat{H}, \hat{G}) c_n}{P^{1-(\lceil \frac{n}{\hat{N}_2} \rceil - 1)\Delta}} \right) +$$

$$\left( \sum_{n=1, \lceil \frac{n}{\hat{N}_1} \rceil > \lceil \frac{n}{\hat{N}_2} \rceil}^{\hat{N}_1 \hat{N}_2 t} \frac{G^H N(\hat{H}) c_n}{P^{1-(\lceil \frac{n}{\hat{N}_2} \rceil - 1)\Delta}} + \frac{G^H N(\hat{G}) u}{P^0 I_{N_1}} + \right.$$

$$\frac{G^H N(\hat{H}) v}{P^a I_{N_2}} + \frac{\epsilon_2}{P^0 I_{N_2}}$$

$$\approx \left( \sum_{n=1, \lceil \frac{n}{\hat{N}_1} \rceil = \lceil \frac{n}{\hat{N}_2} \rceil}^{N_2} \frac{G^H R(\hat{H}, \hat{G}) c_n}{P} + \sum_{n=1, \lceil \frac{n}{\hat{N}_1} \rceil > \lceil \frac{n}{\hat{N}_2} \rceil}^{N_2} \frac{G^H N(\hat{H}) c_n}{P} \right) +$$

$$\left( \sum_{n=N_2+1, \lceil \frac{n}{\hat{N}_1} \rceil = \lceil \frac{n}{\hat{N}_2} \rceil}^{N_2 \times 2} \frac{G^H R(\hat{H}, \hat{G}) c_n}{P^{1-\Delta}} + \sum_{n=N_2+1, \lceil \frac{n}{\hat{N}_1} \rceil > \lceil \frac{n}{\hat{N}_2} \rceil}^{N_2 \times 2} \frac{G^H N(\hat{H}) c_n}{P^{1-\Delta}} \right) + \ldots +$$

$$\left( \sum_{n=N_2(\hat{N}_1-1)+1, \lceil \frac{n}{\hat{N}_1} \rceil = \lceil \frac{n}{\hat{N}_2} \rceil}^{N_2 \times \hat{N}_1} \frac{G^H R(\hat{H}, \hat{G}) c_n}{P^{1-(\hat{N}_1-1)\Delta}} + \sum_{n=N_2(\hat{N}_1-1)+1, \lceil \frac{n}{\hat{N}_1} \rceil > \lceil \frac{n}{\hat{N}_2} \rceil}^{N_2 \times \hat{N}_1} \frac{G^H N(\hat{H}) c_n}{P^{1-(\hat{N}_1-1)\Delta}} \right) +$$

$$\frac{G^H N(\hat{G}) u}{P^0 I_{N_1}} + \frac{G^H N(\hat{H}) v}{P^a I_{N_1}} + \epsilon_2$$

The approximation is due to the fact that $G^H N(\hat{H}) c_n$ is dominant compared to $G^H R(\hat{H}, \hat{G}) c_n$ since $$1 - \left( \lceil \frac{n}{N_1} \rceil - 1 \right) \Delta \leq 1 - \left( \lceil \frac{n}{N_2} \rceil - 1 \right) \Delta.$$

The CS1 received by Rx2 are written as the sum of $N_1$ brackets. $N_2$ unique CS1 are contained in each bracket and received with the same power. Specifically, the mth bracket (m∈1, 2, ..., $\hat{N}_1$) contains the common symbols with index from $(m-1) \times N_2 + 1$ to $m \times N_2$, and their received power scale as $P^{1-(m-1)\Delta}$.

Decoding at Rx2 is using MMSE-SIC and similar as that in Rx1. Consequently, the DoF of the common message achieved at Rx2 is $\hat{N}_1 \hat{N}_2 t \Delta = N_2(1-a) = N_1(1-b)$, identical to that decoded by Rx1. Besides, the DoF of PS2 is $N_2 a$. Moreover, the sum DoF performance is $N_2 + N_1 b$.

Besides, it is important to note that $a \geq (\hat{N}_2 - \hat{N}_1) \Delta$ (derived from $$1 - \left( \lceil \frac{n}{N_1} \rceil - 1 \right) \Delta \geq 1 - \left( \lceil \frac{n}{N_2} \rceil - 1 \right) \Delta - a)$$

is a necessary condition performing this transmission design. Otherwise, $H^H R(\hat{H}, \hat{G}) c_n$ might not be dominant compared to $H^H N(\hat{H}) c_n$ at Rx1.

2.4.2. Rx1 has Larger Inherent DoF for the Common Messages Compared to Rx2, Namely $N_1(1-b) > N_2(1-a)$ In this case, based on MC 1, the maximum achievable DoF of PS1 is $N_1 b$ while keeping $d_c + d_2 = N_2$ because Rx1 has a larger inherent DoF. The sum DoF performance $N_2 + N_1 \bar{b}$ has been shown as the optimal result since it is consistent with the outer-bound.

The transmission strategy is constructed by calculating $a' \leq a$ such that $N_1(1-b) = N_2(1-a')$. Then, using the scheme introduced in Section 2.4.1, the power allocated to the private symbols intended for Rx2 is $P^{a'}$ and the DoF of each CS1 is determined as $$\Delta = \frac{1-a'}{\hat{N}_1} = \frac{1-b}{\hat{N}_2}.$$

The transmitted signal is therefore written as:

$$s = \left( \sum_{n=1, \lceil \frac{n}{\hat{N}_1} \rceil = \lceil \frac{n}{\hat{N}_2} \rceil}^{\hat{N}_1 \hat{N}_2 t} \frac{R(\hat{H}, \hat{G}) c_n}{P^{1-(\lceil \frac{n}{\hat{N}_2} \rceil - 1)\Delta}} \right) +$$
Equation 13

$$\left( \sum_{n=1, \lceil \frac{n}{\hat{N}_1} \rceil > \lceil \frac{n}{\hat{N}_2} \rceil}^{\hat{N}_1 \hat{N}_2 t} \frac{R(\hat{H}, \hat{G}) c_n}{P^{1-(\lceil \frac{n}{\hat{N}_1} \rceil - 1)\Delta}} + \frac{N(\hat{H}) c_n}{P^{1-(\lceil \frac{n}{\hat{N}_2} \rceil - 1)\Delta}} \right) +$$

$$\frac{N(\hat{G}) u}{P^b I_{N_1}} + \frac{N(\hat{H}) v}{P^{a'} I_{N_2}}$$

Since $N_1(1-b) \geq N_2(1-a)$, it can be verified that $a \geq (\hat{N}_2 - \hat{N}_1) \Delta$ and both receivers decode the CS1 with the DoF $N_1(1-b) = N_2(1-a')$. Besides, $N(\hat{H}) v$ will not cause interference at Rx1 as $a' \leq a$. Consequently, the sum DoF is $N_2(1-a') + N_1 b + N_2 a' = N_2 + N_1 b$.

2.4.3. Rx2 has a Larger Inherent DoF for the Common Messages, Namely $N_1(1-b) < N_2(1-a)$ The scheme introduced in Section 2.4.1 does not work here since such b' satisfying $0 \leq b' \leq b$ and $N_1(1-b') = N_2(1-a)$ does not necessarily exist. Therefore, based on MC 1, the power and DoF for PS2 is increased so as to decrease the inherent DoF for common messages at Rx2 till both receivers have same amount of inherent DoF for common messages. Although this will cause interference at Rx1, it still benefits the sum DoF performance as Rx2 has larger number of antennas because $N_2 \geq N_1$ and PS2 contribute to the sum DoF performance more than PS1.

Once the power of PS2 is increased to $P^{a'}$, the interference caused at Rx1 is $P^{a'-a}$. The inherent DoF for common messages is found by $N_1(1-\max(b, a'-a)) = N_2(1-a')$. Hence, the transmission strategy depends on whether PS1 is drowned by the interference or not, namely the relationship between b and $a'-a$.

1) $d_c$ is found when $a'-a \leq b$, namely $d_c=N_1(1-b)=N_2(1-a')$ and this leads to $$a \geq (N_2 - N_1) \times \frac{1-b}{N_2}.$$

Compute $a'>a$, such that $N_1(1-b)=N_2(1-a')$;

Using the scheme introduced in Section 2.4.1, the power allocated to the private symbols intended for Rx2 is $P^{a'}$ and the DoF of each CS1 is determined as $$\Delta = \frac{1-a'}{\hat{N}_1} = \frac{1-b}{\hat{N}_2}.$$

The transmitted signal is therefore written as:

$$s = \left( \sum_{n=1, \lceil \frac{n}{N_1} \rceil = \lceil \frac{n}{N_2} \rceil}^{\hat{N}_1 \hat{N}_2 t} \frac{R(\hat{H}, \hat{G})c_n}{P^{1-(\lceil \frac{n}{N_2} \rceil -1)\Delta}} \right) + \quad \text{Equation 14}$$

$$\left( \sum_{n=1, \lceil \frac{n}{N_1} \rceil > \lceil \frac{n}{N_2} \rceil}^{\hat{N}_1 \hat{N}_2 t} \frac{R(\hat{H}, \hat{G})c_n}{P^{1-(\lceil \frac{n}{N_1} \rceil -1)\Delta}} + \frac{N(\hat{H})c_n}{P^{1-(\lceil \frac{n}{N_2} \rceil -1)\Delta}} \right) +$$

$$\frac{N(\hat{G})u}{P^b} I_{N_1} + \frac{N(\hat{H})v}{P^{a'}} I_{N_2}$$

Since $$a \geq (N_2 - N_1) \times \frac{1-b}{N_2},$$

the necessary condition $a \geq (\hat{N}_2 - \hat{N}_1)\Delta$ holds. The received signals are written as:

$$y = \left( \sum_{m=1}^{\hat{N}_2} \sum_{n=N_1 \times (m-1)+1}^{N_1 \times m} \frac{H^H R(\hat{H}, \hat{G})c_n}{P^{1-(m-1)\Delta}} \right) + \quad \text{Equation 15}$$

$$\frac{H^H N(\hat{G})u}{P^b} I_{N_1} + \frac{H^H N(\hat{H})v}{P^{a'-a}} I_{N_1} + \epsilon_1$$

$$z = \quad \text{Equation 16}$$

$$\sum_{m=1}^{\hat{N}_1} \left( \sum_{\substack{n=N_2(m-1)+1, \\ \lceil \frac{n}{N_1} \rceil = \lceil \frac{n}{N_2} \rceil}}^{N_2 \times m} \frac{G^H R(\hat{H}, \hat{G})c_n}{P^{1-(m-1)\Delta}} + \sum_{\substack{n=N_2(m-1)+1, \\ \lceil \frac{n}{N_1} \rceil > \lceil \frac{n}{N_2} \rceil}}^{N_2 \times m} \frac{G^H N(\hat{H})c_n}{P^{1-(m-1)\Delta}} \right) +$$

$$\frac{G^H N(\hat{G})u}{P^0} I_{N_1} + \frac{G^H N(\hat{H})v}{P^{a'}} I_{N_2} + \epsilon_2$$

As $b \geq a'-a$, $H^H N(\hat{G})u$ is the dominant part compared to $H^H N(\hat{H})v$. Hence, Both receivers can decode CS1 and the DoF achieved by CS1 is $N_1(1-b)=N_2(1-a')$. After removing $c_n$, Rx1 decodes $H^H N(\hat{G})u$ by treating $H^H N(\hat{H})v$ as noise and $H^H N(\hat{G})u$ achieves the DoF $N_1(b-a'+a)$. Rx2 recovers $G^H N(\hat{H})v$ only subject to noise and the DoF of $G^H N(\hat{H})v$ is $N_2 a'$. Consequently, the sum DoF performance is $$N_2 + N_1(b - a' + a) = N_2 + N_1\left(a + \frac{N_2 - N_1}{N_2}(b-1)\right).$$

2) $d_c$ is found when $a'-a>b$, namely $d_c=N_1(1-a'+a)=N_2(1-a')$ and this leads to $$a < (N_2 - N_1) \times \frac{1-b}{N_2}:$$

Compute $a'>a$, such that $N_1(1-a'+a)=N_2(1-a')$;

Using the scheme introduced in Section 2.4.1, the power allocated to PS2 is $P^{a'}$ and the DoF of each CS1 is determined as $$\Delta = \frac{1-a'}{\hat{N}_1} = \frac{1-a'+a}{\hat{N}_2},$$

while PS1 is sent because $b<a'-a$. The transmitted signal is therefore written as:

$$s = \left( \sum_{n=1, \lceil \frac{n}{N_1} \rceil = \lceil \frac{n}{N_2} \rceil}^{\hat{N}_1 \hat{N}_2 t} \frac{R(\hat{H}, \hat{G})c_n}{P^{1-(\lceil \frac{n}{N_2} \rceil -1)\Delta}} \right) + \quad \text{Equation 17}$$

$$\left( \sum_{n=1, \lceil \frac{n}{N_1} \rceil > \lceil \frac{n}{N_2} \rceil}^{\hat{N}_1 \hat{N}_2 t} \frac{R(\hat{H}, \hat{G})c_n}{P^{1-(\lceil \frac{n}{N_1} \rceil -1)\Delta}} + \frac{N(\hat{H})c_n}{P^{1-(\lceil \frac{n}{N_2} \rceil -1)\Delta}} \right) + \frac{N(\hat{H})v}{P^{a'}} I_{N_2}$$

Simply replacing $$\Delta = \frac{1-a'+a}{\hat{N}_2},$$

the condition $a \geq (\hat{N}_2 - \hat{N}_1)\Delta$ can be verified. The received signals are written as:

$$y = \left( \sum_{m=1}^{\hat{N}_2} \sum_{n=N_1 \times (m-1)+1}^{N_1 \times m} \frac{H^H R(\hat{H}, \hat{G})c_n}{P^{1-(m-1)\Delta}} \right) + \frac{H^H N(\hat{H})v}{P^{a'-a}} I_{N_1} + \epsilon_1 \quad \text{Equation 18}$$

$$z = \quad \text{Equation 19}$$

$$\sum_{m=1}^{\hat{N}_1} \left( \sum_{\substack{n=N_2(m-1)+1, \\ \lceil \frac{n}{N_1} \rceil = \lceil \frac{n}{N_2} \rceil}}^{N_2 \times m} \frac{G^H R(\hat{H}, \hat{G})c_n}{P^{1-(m-1)\Delta}} + \sum_{\substack{n=N_2(m-1)+1, \\ \lceil \frac{n}{N_1} \rceil > \lceil \frac{n}{N_2} \rceil}}^{N_2 \times m} \frac{G^H N(\hat{H})c_n}{P^{1-(m-1)\Delta}} \right) +$$

$$\frac{G^H N(\hat{H})v}{P^a} I_{N_2} + \epsilon_2$$

The decoding is similar as above and using MMSE-SIC. As no PS1 is sent, the sum DoF performance is $N_2$. Note that the CSIT does not make a contribution to the sum DoF performance compared to the scenario without CSIT of either receiver (the sum DoF is $N_2$ as well, achieved by sending private symbols to Rx2 only), but the Tx can make use of the CSIT to send common messages with the DoF $N_2(1-a')$. Since the common messages can be regarded as intended for Rx1, this case is more meaningful in the scenario where the two receivers have their particular QoS target or the Tx has to consider fairness between the receivers.

2.5 Transmission Strategy for Multiple Subband Scenario
2.5.1. Two-Subband Scenario $N_2(1-\bar{a})=N_1(1-\bar{b})$ and the Transmission of CS2

Here, consider a two-subband scenario with $$N_2\left(1 - \frac{a_1 + a_2}{2}\right) = N_1\left(1 - \frac{b_1 + b_2}{2}\right)$$

and the transmission strategy can be easily extended to multiple-subband scenario. Besides, assume $N_1(1-\bar{b}_1) > N_2(1-a_1)$ and $N_1(1-b_2) < N_2(1-a_2)$, namely Rx1 has larger inherent DoF for common messages in subband 1, while Rx2 has larger inherent DoF for common messages in subband 2. The case $N_1(1-b_1)=N_2(1-a_1)$ and $N_1(1-b_2)=N_2(1-a_2)$ can be solved independently and separately using the method introduced in Section 2.3. The scenario $$N_2\left(1 - \frac{a_1 + a_2}{2}\right) \neq N_1\left(1 - \frac{b_1 + b_2}{2}\right)$$

will be discussed later.

Based on MC 3, the key ingredient in this scheme is to send CS2 with the DoF $N_2(1-a_2)-N_1(1-b_2)$ (or equivalently $N_1(1-b_1)-N_2(1-a_1)$), such that Rx2 can decode them from subband 2 and Rx1 recovers them from subband 1.

Transmission Strategy:

1) Private symbols: In each subband, $N_1$ private symbols are sent to Rx1 with the ZF-precoder $N(\hat{G}_j)$ and the power $P^{b_j}$, while $N_2$ private symbols are sent to Rx2 with the ZF-precoder $N(\hat{H}_j)$ and the power $P^{a_j}$.

2) CS1 in subband 1: The DoF is determined to be $N_2(1-a_1)$. According to MC 2 and as discussed in Section 2.4.1, $\hat{N}_1\hat{N}_2 t$ CS1 are sent to both receivers. These CS1 in subband 1 are denoted as $c_{1:N_1N_2}^I(1)$. Each CS1 has the $$DoF\Delta_1 = \frac{1-a_1}{\hat{N}_1}.$$

The necessary condition, $a_1 \geq (\hat{N}_2-\hat{N}_1)\Delta_1$, can be verified using the fact that $N_1(1-b_1) > N_2(1-a_1)$.

3) CS1 in subband 2: The DoF is determined to be $N_1(1-b_2)$. The method introduced in Section 2.4.1 is not applicable here because the necessary condition $a_2 \geq (\hat{N}_2-\hat{N}_1)\Delta_2$ $$\left(\text{where } \Delta_2 = \frac{1-b_2}{\hat{N}_2}\right)$$

does not hold in general. Hence, the joint design of CS1 and CS2 is considered here.

A. $a_2 \geq b_2$: The transmission of CS1 in subband 2 is divided into two parts as shown in Table 1.

Table 2 denotes the generation of two parts of CS1 in subband 2 when $a_2 \geq b_2$ where $$r = \frac{N_2 a_2 - N_1 b_2}{N_2 - N_1}$$

and r is derived from $N_1(r-b_2)=N_2(r-a_2)$. $c_n^{I,1}(2)$ are generated using the method given in MC 2 and Section 2.4.1. $c_n^{I,2}(2)$ are sent with power higher than $c_n^{I,1}(2)$. $c_n^{I,2}(2)$ will be received by both receivers in $\hat{N}_1$ power levels and each level contains $N_1$ unique $c_n^{I,2}(2)$.

B. $a_2 < b_2$: The CS1 in subband 2 are generated similar as the second part of CS1 in the case $a_2 \geq b_2$. $\hat{N}_1\hat{N}_1 t$ CS1 are transmitted and the total DoF of them is $N_1(1-b_2)$. They are denoted as $c_n^I(2)$. Both receivers employ $N_1$ dimensions of the received signal to decode them and observe them in $\hat{N}_1$ power levels. The precoder is $R(\hat{H}_2, \hat{G}_2)$. Each of them has the $$DoF\delta_1 = \frac{1-b_2}{\hat{N}_1}$$

and is allocates with the power $$P^{1-\left(\left\lceil \frac{n}{N_1}\right\rceil - 1\right)\delta_1}.$$

4) CS2 Transmission: The DoF is Determined to be $N_1(1-b_1)-N_2(1-a_1)=N_2(1-a_2)-N_2(1-b_2)$.

A. $a_2 \geq b_2$: Rx1 decodes CS2 using $N_1$ dimensions of the received signal in subband 1 while Rx2 employs $N_2 N_1$ dimensions to decode them (because $N_1$ dimensions have been used to decode $c_n^{I,2}(2)$). Based on MC 3, $\hat{N}_1(\hat{N}_2-\hat{N}_1)t$ CS2 are sent and they are denoted as $c_n^{II}$, $n=1, 2, \ldots, \hat{N}_1(\hat{N}_2-\hat{N}_1)t$. Each of them has the target $$DoF \frac{N_2(1-a_2) - N_1(1-b_2)}{\hat{N}_1(\hat{N}_2-\hat{N}_1)t} = \frac{1-r}{\hat{N}_1} = \delta,$$

same as $c_n^{I,2}(2)$:

In subband 1, $c_n^{II}$ is allocated with power $$P^{1-\hat{N}_2\Delta_1-\left(\left\lceil \frac{n}{N_1}\right\rceil - 1\right)\delta}$$

and the precoder is $R(\hat{H}_1)$.

TABLE 1

| | Notation | DoF | Number | DoF/symbol | | Power | Precoder |
|---|---|---|---|---|---|---|---|
| Part 1 | $c_n^{I,1}(2)$ | $N_1(r-b_2)$ | $\hat{N}_1\hat{N}_2 t$ | $\Delta_{2,1} = \dfrac{r-b_2}{\hat{N}_2}$ | | Derived based on MC 2 and Section 2.4.1 | |
| | | | | $= \dfrac{r-a_2}{\hat{N}_1}$ | | | |
| Part 2 | $c_n^{I,2}(2)$ | $N_1(1-r)$ | $\hat{N}_1\hat{N}_1 t$ | $\delta = \dfrac{1-r}{\hat{N}_1}$ | | $P^{1-\left(\left\lceil \frac{n}{N_1}\right\rceil-1\right)\delta}$ | $R(\hat{H}_2, \hat{G}_2)$ |

In subband 2, $c_n^{II}$ is allocated with power $$P^{1-\left(\left\lceil\frac{n}{N_2-N_1}\right\rceil-1\right)\delta}$$

and the precoder is $R(\hat{G}_2)$.

B. $a_2 < b_2$: the transmission of CS2 is divided into two parts as shown in Table 2.

TABLE 2

| | Notation | DoF | Number | DoF/symbol | Power | Precoder |
|---|---|---|---|---|---|---|
| Part 1 | $c_n^{II,1}$ | $(N_2-N_1)(1-b_2)$ | $\hat{N}_1(\hat{N}_2-\hat{N}_1)t$ | $\delta_1 = \dfrac{1-b_2}{\hat{N}_1}$ | | Derived based on MC 3 |
| Part 2 | $c_n^{II,2}$ | $N_2(b_2-a_2)$ | $\hat{N}_1\hat{N}_2 t$ | $\delta_2 = \dfrac{b_2-a_2}{\hat{N}_1}$ | | |

Table 3 denotes CS2 generation when $a_2 < b_2$. Note that $c_n^{II,1}$ is decoded by Rx1 in subband 1 using $N_1$ dimensions and decoded by Rx2 in subband 2 using $N_2-N_1$ dimensions of the received signal (because $N_1$ dimensions have been used to decode $c_n^I(2)$).

In subband 1, is allocated with power $$P^{1-\hat{N}_2\Delta_1-\left(\left\lceil\frac{n}{N_1}\right\rceil-1\right)\delta_1}.$$

They will be received by Rx1 in $\hat{N}_2-\hat{N}_1$ power levels and each level contains $N_1$ unique $c_n^{II,1}$; $c_n^{II,2}$ is allocated with power $$P^{1-\hat{N}_2\Delta_1-(\hat{N}_2-\hat{N}_1)\delta_1-\left(\left\lceil\frac{n}{N_1}\right\rceil-1\right)\delta_2}$$

and observed by Rx1 in $\hat{N}_2$ power levels. Both $c_n^{II,1}$ and $c_n^{II,2}$ are transmitted with the precoder $R(\hat{H}_1)$.

In subband 2, $c_n^{II,1}$ is allocated with power $$P^{1-\left(\left\lceil\frac{n}{N_2-N_1}\right\rceil-1\right)\delta_1}.$$

They will be received by Rx2 in $\hat{N}_1$ power levels and each level contains $N_2-N_1$ unique $C_n^{II,1}$; $c_n^{II,2}$ is allocated with power $$P^{1-\hat{N}_1\delta_1-\left(\left\lceil\frac{n}{N_2}\right\rceil-1\right)\delta_2}$$

and observed by Rx2 in $\hat{N}_1$ power levels. Both $c_n^{II,1}$ and $c_n^{II,2}$ are transmitted with the precoder $R(\hat{G}_2)$.

Figure 3:
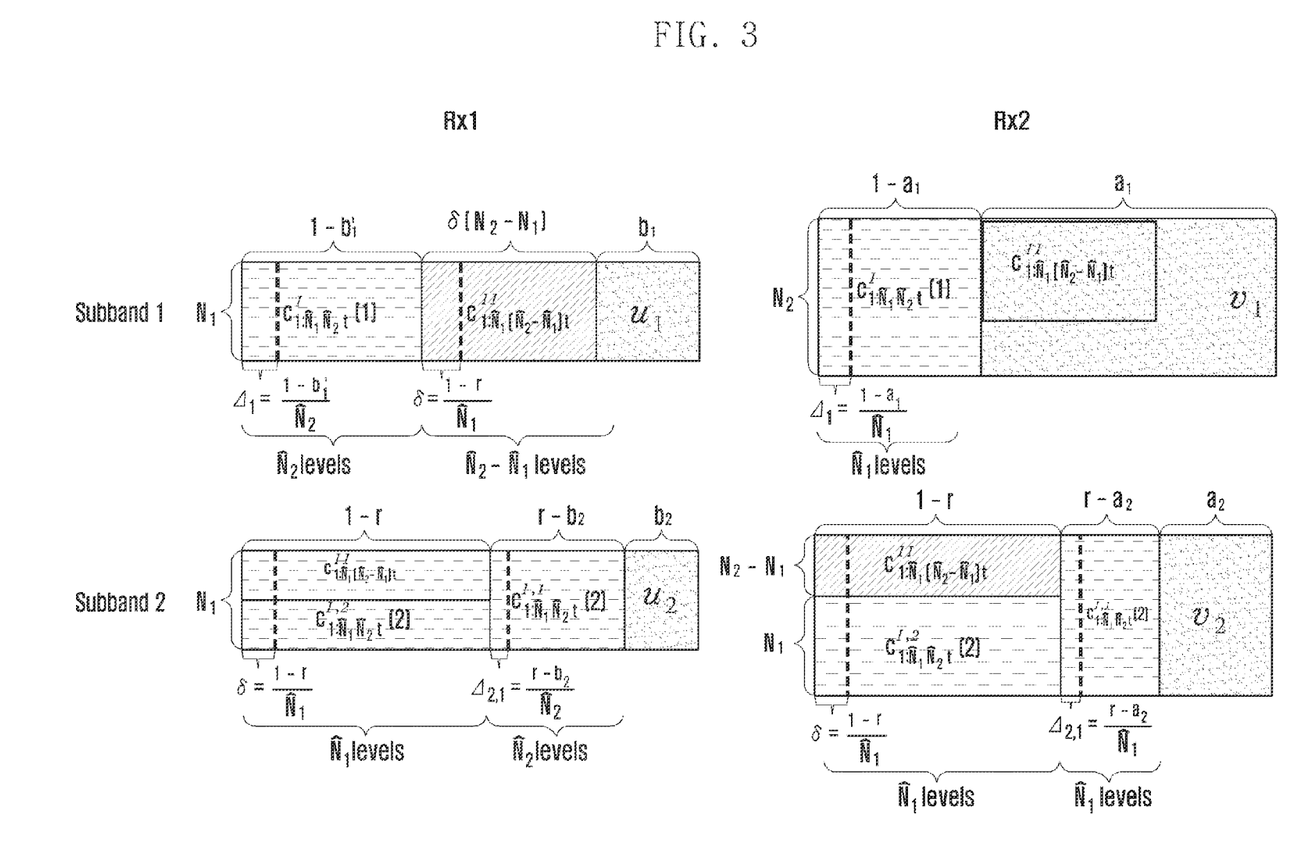
FIG. 3 is a diagram illustrating received signals at each receiver according to an embodiment of the present disclosure.
Figure 4:
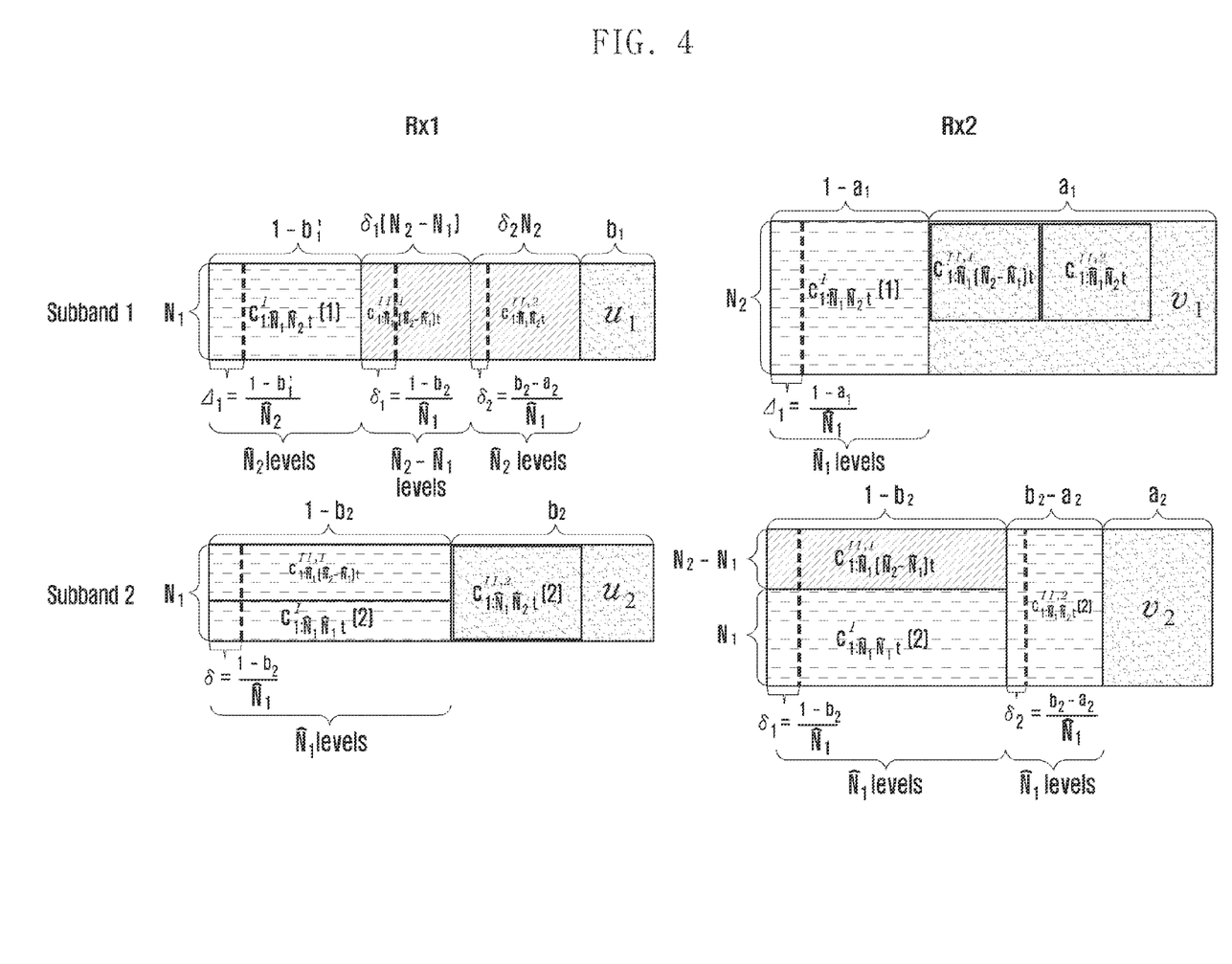
FIG. 4 is a diagram illustrating received signals at each receiver according to another embodiment of the present disclosure.

With the proposed strategy, the received signals at each receiver are illustrated in FIGS. 3 and 4 for $a_2 \geq b_2$ and $a_2 < b_2$ respectively.

FIG. 3 is a diagram illustrating received signals at each receiver when $a_2 \geq b_2$ according to an embodiment of the present disclosure. The upper-left, upper-right, lower-left and lower-right blocks respectively refer to $y_1$, $z_1$, $y_2$ and $z_2$.

Referring to FIG. 3, a) The private symbols are received with the power subject to the CSIT quality of their unintended receiver;

b) According to step 2, Rx1 receives $c_{1:\hat{N}_1\hat{N}_2 t}^{I}(1)$ with $N_1$ dimensions and $\hat{N}_2$ power levels, while Rx2 receives with $N_2$ dimensions and $\hat{N}_1$ power levels;

c) Following step 3.A, $c_{1:\hat{N}_1\hat{N}_2 t}^{I,1}(2)$ are received by Rx1 in $N_1$ dimensions and $r-b_2$ channel use (namely $\hat{N}_2$ power levels), while they are received by Rx2 in $N_2$ dimensions and $r-a_2$ channel use (namely $\hat{N}_1$ power levels);

d) Based on step 3.A, $c_{1:\hat{N}_1\hat{N}_1 t}^{I,2}(2)$ are received by both receivers in $1-r$ channel use ($\hat{N}_1$ power levels) but only spanning $N_1$ dimensions; and e) As in step 4.A, $c_{1:\hat{N}_1(\hat{N}_2-\hat{N}_1)t}^{II}$ are received by Rx2 in $1-r$ channel use ($\hat{N}_1$ power levels) and spanning the remaining $N_2-N_1$ dimensions in subband 2. At Rx1, $c_{1:\hat{N}_1(\hat{N}_2-\hat{N}_1)t}^{II}$ are received in $N_1$ dimensions and $\hat{N}_2-\hat{N}_1$ power levels in subband 1.

Decoding (MMSE-SIC):

Rx1 decodes $c_{1:\hat{N}_1\hat{N}_2 t}^{I}(1)$, $c_{1:\hat{N}_1(\hat{N}_2-\hat{N}_1)t}^{II}$ and $u_1$ from $y_1$ using SIC; With the knowledge of $c_{1:\hat{N}_1(\hat{N}_2-\hat{N}_1)t}^{II}$, Rx1 recovers $c_{1:\hat{N}_1\hat{N}_1 t}^{I,2}(2)$, $c_{1:\hat{N}_1\hat{N}_2 t}^{I,1}(2)$ and $u_2$ from $y_2$; and Rx2 decodes $c_{1:\hat{N}_1(\hat{N}_2-\hat{N}_1)t}^{II}$ and $c_{1:\hat{N}_1\hat{N}_1 t}^{I,2}(2)$ from $z_2$ by treating $c_{1:\hat{N}_1\hat{N}_2 t}^{I,1}(2)$ and $2_i$ as noise. After that, $c_{1:\hat{N}_1\hat{N}_2 t}^{I,1}(2)$ and $v_2$ are decoded using SIC; With the knowledge of $c_{1:\hat{N}_1(\hat{N}_2-\hat{N}_1)t}^{II}$, $c_{1:\hat{N}_1\hat{N}_2 t}^{I}(1)$ and $v_1$ are decoded.

FIG. 4 is a diagram illustrating received signals at each receiver when $a_2 < b_2$ according to another embodiment of the present disclosure. The upper-left, upper-right, lower-left and lower-right blocks respectively refer to $y_1$, $z_1$, $y_2$ and $z_2$.

Referring to FIG. 4, a) The private symbols and $c_{1:\hat{N}_1\hat{N}_2 t}^{I}(1)$ are received similar as in FIG. 3;

b) As in step 3.B, $c_{1:\hat{N}_1\hat{N}_1 t}^{I}(2)$ are received by both receivers in $1-b_2$ channel use ($\hat{N}_1$ power levels) but only spanning $N_1$ dimensions;

c) According to step 4.B, $c_{1:\hat{N}_1(\hat{N}_2-\hat{N}_1)t}^{II,1}$ are received by Rx2 in $1-b_2$ channel use ($\hat{N}_1$ power levels) and spanning the remaining $N_2-N_1$ dimensions in subband 2. At Rx1, $c_{1:\hat{N}_1(\hat{N}_2-\hat{N}_1)t}^{II,1}$ is received in $N_1$ dimensions and $N_2-N_1$ power level in subband 1; and d) Also based on step 4.B, $c_{1:\hat{N}_1\hat{N}_2 t}^{II,2}$ are received by Rx1 in subband 1 with $N_1$ dimensions and $\hat{N}_2$ power levels, while they are received by Rx2 in $N_2$ dimensions and $\hat{N}_1$ power levels in subband 2.

Decoding:

Rx1 decodes $c_{1:\hat{N}_1\hat{N}_2 t}^{I}(1)$, $c_{1:\hat{N}_1(\hat{N}_2-\hat{N}_1)t}^{II,1}$, $c_{1:\hat{N}_1\hat{N}_2 t}^{II,2}$ and $u_1$ from $y_1$ using SIC; With the knowledge of $c_{1:\hat{N}_1(\hat{N}_2-\hat{N}_1)t}^{II,1}$ and $c_{1:\hat{N}_1\hat{N}_2 t}^{II,2}$, Rx1 recovers $c_{1:\hat{N}_1\hat{N}_1 t}^{I}(2)$ and private symbols from $y_2$; and Rx2 decodes and $c_{1:\hat{N}_1(\hat{N}_2-\hat{N}_1)t}^{II,1}$ and $c_{1:\hat{N}_1\hat{N}_1 t}^{I}(2)$ from $z_2$ by treating $c_{1:\hat{N}_1\hat{N}_2 t}^{II,2}$ and $v_2$ as noise. After that, $c_{1:\hat{N}_1\hat{N}_2 t}^{II,2}$ and $v_2$ are decoded using SIC; With the knowledge of $c_{1:\hat{N}_1(\hat{N}_2-\hat{N}_1)t}^{II,1}$ and $c_{1:\hat{N}_1\hat{N}_2 t}^{II}$, $c_{1:\hat{N}_1\hat{N}_2 t}^{I}(1)$ and $v_1$ are decoded from $z_1$.

2.5.2. Extension to Multiple-Subband Scenario with $N_2(1-\bar{a})=N_1(1-\bar{b})$ The private symbols and CS1 are transmitted in each subband following the footsteps 1) to 3) in Section 2.5.1. The DoF achieved by PS1 and PS2 are respectively $N_1\bar{b}$ and $N_2\bar{a}$, while CS1 achieves the $$DoF \frac{\sum_{j=1}^{L} \min(N_1(1-b_j), N_2(1-a_j))}{L}.$$

The CS2 are generated to achieve the $$DoF \frac{\frac{1}{2}\sum_{j=1}^{L} \max(N_1(1-b_j), N_2(1-a_j)) - \min(N_1(1-b_j), N_2(1-a_j))}{L}.$$

Rx1 decodes them from the subbands with $N_1(1-b_j)>N_2(1-a_j)$ while Rx2 decodes them from the subbands $N_1(1-b_j)<N_2(1-a_j)$. To this end, the procedure introduced in MISO scheme can be reused.

Briefly, the transmitter randomly pairs the subbands with $N_1(1-b_{j1})>N_2(1-a_{j1})$ and those with $N_1(1-b_{j2})<N_2(1-a_{j2})$, then CS2 are generated using step 4) in Section 2.5.1 and achieving the DoF $\min(q_{j1}^+, q_{j2}^-)$, where $q_{j1}^+=N_1(1-b_{j1})-N_2(1-a_{j1})$ and $q_{j2}^+=N_2(1-a_{j2})-N_1(1-b_{j2})$. After that, update $q_{j1}^+=q_{j1}^+-\min(q_{j1}^+, q_{j2}^-)$ and $q_{j2}^-=q_{j2}^- -\min(q_{j1}^+, q_{j2}^-)$. Then repeat the procedure till all of $q_{j1}^+$ and $q_{j2}^-$ are zero.

2.5.3. Scenario $N_2(1-\bar{a})<N_1(1-\bar{b})$ (Rx1 has a Larger Inherent DoF for Common Messages)

Similar as the discussion in Section 2.4.2 and based on MC 1, the transmission strategy is designed by 1) Finding $a'_j \leq a_j$, $\forall j$, such that $N_2(1-\bar{a}')=N_1(1-\bar{b})$; 2) Reusing the design introduced in Section 2.5.2 and replacing $a_j$ with $a'_j$. The sum DoF performance is $N_2+N_1\bar{b}$, which has been shown consistent with the outer-bound.

2.5.4. Scenario $N_2(1-\bar{a})>N_1(1-\bar{b})$ (Rx2 has a Larger Inherent DoF for Common Messages)

The transmission strategy in this scenario follows MC 1. Similar as the discussion in Section 2.4.3, $d_c+d_2=N_2$ is guaranteed by increasing the power and DoF of PS2 and the power allocated to PS1 is fixed to be $P^{b_j}$. At the same time, in order to send PS1 with a DoF as high as possible, the increment of PS2 is started from the subband with the lowest $b_1$. In this way, the DoF loss of PS2 can be minimized while the gap between the inherent DoF for common messages at each receiver is reducing. Specifically, the footsteps are given as follows:

Ordering the subband by $b_j$ in ascending order. $\pi(j)$ is used to denote the subband with the jth lowest $b_j$;

i=1;

Increasing the power and DoF of PS1 in subband $\pi(i)$ to $a'_{\pi(i)}$, where $a_{\pi(i)}<a'_{\pi(i)}\leq 1$, If $\sum_{j=1}^{i-1} N_1 \min(a_{\pi(j)}, 1-b_{\pi(j)}) + \sum_{j=i+1}^{L} N_1(1-b_{\pi(j)}) + N_1(1-\max(b_{\pi(i)}, a'_{\pi(i)}-a_{\pi(i)})) = \sum_{j=i+1}^{L} N_2(1-a_{\pi(j)}) + N_2(1-a'_{\pi(i)})$, go to step d and set $a'_{\pi(j>i)} = a_{\pi(j>i)}$;

Else, set $a'_{\pi(i)}=1$ and $i=i+1$.

Construct the transmission strategy with $a'_{1:L}$ and $b_j$ as discussed in Section 2.5.2.

The l.h.s and r.h.s of the equation in step c respectively stand for the inherent DoF for common messages at Rx1 and Rx2 after increasing $a_{\pi(1:i)}$ to $a'_{\pi(1:i)}$. Since increasing $a_i$ to $a'_i$ strictly reduces the gap between inherent DoF at Rx2 and Rx1, a new equality for the common messages will be found. Finally, the sum DoF performance is given by:

$$N_2 + N_1 \frac{\sum_{j=1}^{L}(b_j - a'_j + a_j)^+}{L}.$$

Note that in the multiple subbands scenario with the CSIT quality $a_{i:L}=a$ and $b_{i:L}=b$ across the subbands, the transmission strategy proposed in this section results in a better DoF performance compared to using the single-subband transmission (see Section 2.4.3) individually in each subband. Especially for the case $$a + \frac{N_2 - N_1}{N_2}(b-1) < 0,$$

the sum DoF is $N_2$ in Section 2.4.3, while the multiple-subband transmission strictly outperforms this as the Tx can always transmit PS1 in some subbands. Hence, unlike the MISO case, the specific CSIT pattern not only impact the transmission strategy, but also the sum DoF performance.

2.6 Signaling Mechanisms Needed to Operate the Transmission Strategies

CSIT Quality Feedback

As in Section 2.1, the CSIT quality in MIMO case is defined based on the norm of each column in the channel matrix, namely the channel vector from the transmission antenna array to each receive antenna. This definition is similar as that in MISO case and moreover assume the channel estimation and quantization at the receive antenna are statistically equivalent. Hence, the similar signaling mechanisms regarding the CSIT quality feedback in MISO case can be reused.

Specifically, depending on the PMI report mode, if wideband PMI (PUCCH 1-1-1, PUCCH 1-1-2 and PUSCH 3-1) and/or all subband PMI (PUSCH 3-2 and PUSCH 1-2) are available, each receiver reports a single value of the CSI accuracy as it is assumed the same across all subbands; if one or several subband PMI is reported (but not all), one or several estimates of the CSIT accuracies are reported.

Transmission Mode Indication

Once the Tx collects the CSI and their qualities from all the receivers, it has to perform user-selection and subband grouping, then makes a decision to the transmission strategy. The similar DCI format as the MISO case can be reused, regarding the size of the transmission block (as it depends on CSIT pattern of the co-scheduled users), the kinds of messages (CS1, CS2 and PS1, PS2), and the number of messages, the modulation and coding scheme of all CS and PS intended for the user, information about whether common message is intended for the user or not, the transmit power of each message. In addition, in the decision of the transmission mode, the following issue should be taken into account:

The format of CS: Based on MC 2 and MC 3, the transmission of CS consists of several power levels depending on the value of $N_1$ and $N_2$. Hence, to perform the decoding, each receiver should know: 1) the number of power levels of the common messages they have observed (for instance, Rx1 should know $N_2$ and Rx2 should know $\hat{N}_1$ according to MC 2, MC 3 and Section 2.4.1) as this relates to the number of stages in the SIC; 2) the received power at each level (for instance, the power received in the mth level $P^{1-(m-1)\Delta}$ according to Section 2.4.1) as this impacts the MMSE filter used in each stage of SIC.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a signal based on channel state information (CSI) qualities of at least two of a plurality of receivers, the method comprising:
    receiving CSI from each of the at least two of the plurality of receivers including a first receiver and a second receiver;
    determining a transmit power and a transmission rate based on the CSI qualities of the at least two of the plurality of receivers calculated from the CSI from each of the at least two of the plurality of receivers; and
    transmitting the signal using the transmit power and the transmission rate,
    wherein the signal comprises a user specific message, a first common message, and a second common message, and
    wherein the second common message is transmitted to the at least two of the plurality of receivers using the transmission rate determined by a difference between a maximum CSI quality of a receiver among the at least two of the plurality of receivers and a CSI quality of each receiver to compensate for the difference between the maximum CSI quality of the receiver among the at least two of the plurality of receivers and the CSI quality of each receiver.

2. The method of claim 1, wherein the user specific message is transmitted to a specific receiver using the transmit power and the transmission rate determined by a CSI quality of the specific receiver.

3. The method of claim 1, wherein the first common message is transmitted to the at least two of the plurality of receivers using the transmit power and the transmission rate determined by a maximum CSI quality of a receiver among the at least two of the plurality of receivers to compensate for a difference between a perfect CSI quality and the maximum CSI quality of the receiver among the at least two of the plurality of receivers.

4. A non-transitory computer-readable recording medium having embodied thereon a computer program that when executed by a computer causes the computer to perform the method of claim 1.

5. A transmitter apparatus for transmitting a signal based on channel state information (CSI) qualities of at least two of a plurality of receivers, the apparatus comprising:
    a transceiver for transmitting and receiving signals to and from the at least two of the plurality of receivers; and
    a controller configured to receive CSI from each of the at least two of the plurality of receivers, to determine a transmit power and a transmission rate based on the CSI qualities of the at least two of the plurality of receivers calculated from the CSI from each of the at least two of the plurality of receivers, and to transmit the signal using the transmit power and the transmission rate,
    wherein the signal comprises a user specific message, a first common message, and a second common message, and
    wherein the second common message is transmitted to the at least two of the plurality of receivers using the transmission rate determined by a difference between a maximum CSI quality of a receiver among the at least two of the plurality of receivers and a CSI quality of each receiver to compensate for the difference between the maximum CSI quality of the receiver among the at least two of the plurality of receivers and the CSI quality of each receiver.

6. The apparatus of claim 5, wherein the controller is further configured for transmitting the user specific message to a specific receiver using the transmit power and the transmission rate determined by a CSI quality of the specific receiver.

7. The apparatus of claim 5, wherein the controller is further configured to transmit the first common message to the at least two of the plurality of receivers using the transmit power and the transmission rate determined by a maximum CSI quality of a receiver among the at least two of the plurality of receivers to compensate for a difference between a perfect CSI quality and the maximum CSI quality of the receiver among the at least two of the plurality of receivers.

* * * * *